(12) United States Patent
Budde et al.

(10) Patent No.: US 7,136,442 B2
(45) Date of Patent: Nov. 14, 2006

(54) RECEIVING CIRCUIT RECEIVING MESSAGE SIGNALS

(75) Inventors: Wolfgang Otto Budde, Aachen (DE); Peter Fuhrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 710 days.

(21) Appl. No.: 10/294,002

(22) Filed: Nov. 12, 2002

(65) Prior Publication Data
US 2003/0103590 A1 Jun. 5, 2003

(30) Foreign Application Priority Data
Nov. 16, 2001 (DE) ............................ 101 56 112

(51) Int. Cl.
*H04L 7/00* (2006.01)
*H04L 27/06* (2006.01)
*H03D 1/00* (2006.01)

(52) U.S. Cl. ................. 375/355; 375/316; 375/326; 375/340

(58) Field of Classification Search ............... 375/340, 375/326, 344, 317, 341, 262, 376, 355, 372, 375/261, 222, 316, 324; 329/315, 323, 343, 329/300, 302, 304, 306; 714/759, 794, 820, 714/709; 327/147, 156, 95; 332/100, 101, 332/103, 104; 370/536, 252; 348/605
See application file for complete search history.

(56) References Cited

U.S. PATENT DOCUMENTS

| | | | | | |
|---|---|---|---|---|---|
| 4,627,080 | A | * | 12/1986 | Debus, Jr. ................. | 375/359 |
| 4,788,696 | A | * | 11/1988 | Sakane et al. ............. | 714/705 |
| 5,532,762 | A | * | 7/1996 | Sakai et al. ................ | 348/738 |
| 5,552,942 | A | * | 9/1996 | Ziperovich et al. .......... | 360/51 |
| 5,862,191 | A | * | 1/1999 | Moridi ..................... | 375/355 |
| 5,889,759 | A | * | 3/1999 | McGibney ................. | 370/207 |
| 5,982,821 | A | * | 11/1999 | Kingston et al. ............ | 375/326 |
| 6,317,471 | B1 | * | 11/2001 | Horigome et al. .......... | 375/341 |
| 6,650,699 | B1 | * | 11/2003 | Tierno ...................... | 375/232 |

* cited by examiner

Primary Examiner—Mohammed Ghayour
Assistant Examiner—Sophia Vlahos
(74) Attorney, Agent, or Firm—Kevin Fortin

(57) ABSTRACT

The subject matter hereof relates to a receiving circuit for receiving a message signal. In an example embodiment, the receiving circuit has a sampler for converting a message signal into a sampled signal, a signal-quality determining unit for determining the quality of the sampled signal, and a control unit for controlling at least one sampling parameter of the sampler as a function of the quality of the sampled signal.

9 Claims, 1 Drawing Sheet

RECEIVING CIRCUIT RECEIVING MESSAGE SIGNALS

The invention relates to a receiving circuit for receiving message signals, having a sampler for converting the message signal into a sampled signal.

What is meant by a message signal is a signal that contains information that is coded in any desired way. A so-called sampler is an arrangement that samples the message signal at definable points in time and converts it into a sampled signal.

Before being transmitted over communications channels or before being recorded on a data carrier, messages, i.e. sets of data, are typically coded in such a way that errors that are caused by disturbances on the channel or faults on the data carrier can be recognized or corrected when the message or data set is received. Possible errors that may occur are, in particular, amplitude and phase errors. Whereas amplitude errors typically cause single-bit or multi-bit errors, phase errors may damage the entire contents of messages. Phase errors occur as a result of, for example, inaccuracies in bit synchronization between transmitter and receiver. A method of avoiding phase errors is edge-based resynchronization, i.e. the bit timing in the receiver is adjusted to the data stream on receipt of each edge in the message. If, however, the input signals are badly affected by noise, this method may result in the bit synchronization unlocking completely and hence in the message content being lost. A method of this kind, where the length of a bit time is adjusted on the basis of an edge that is recognized, is known, for example, from the CAN Specification, version 1.2, Robert Bosch GmbH, 1990. However, when the input signals are badly affected by noise, this method may result in the bit synchronization unlocking completely and hence in the message content being lost.

It is an object of the invention to provide a receiving circuit and a method related thereto that make possible improved decoding of the received message signal.

This object is achieved in accordance with the invention by a receiving circuit for receiving message signals, having a sampler for converting the message signal into a sampled signal, a signal-quality determining unit for determining the quality of the sampled signal, and a control unit for controlling at least one sampling parameter of the sampler as a function of the quality of the sampled signal.

The idea behind the invention is to prevent errors from occurring that might arise as a result of, for example, poor synchronization between transmitter and receiver, and to do so as early as during the reception of a message signal. It is for this purpose that a signal-quality determining unit, which determines the quality of the sampled signal during the very sampling process, is provided. The signal quality is a measure of how well the message signal that is received corresponds to the pattern expected by the sampler.

The signal quality measured by the signal-quality determining unit is supplied to the control unit as an input signal. The control unit then controls at least one sampling parameter of the sampler as a function of the quality of the sampled signal. If the quality of the sampled signal is high, the sampling parameters can be left unchanged. If the quality of the sampled signal declines, the control unit takes controlling action to counteract this, changes at least one sampling parameter, and thus increases the quality of the sampled signal. The invention has the advantage that the sampling is controlled "on-line" so to speak. It becomes possible in this way for any degradation of the signal quality to be recognized in good time and the occurrence of errors to be largely or entirely avoided.

The sampling is preferably performed in accordance with a sampling pattern. What is meant by a sampling pattern is an expected pattern that is repeated cyclically. The expected pattern comprises windows of expectation, with the sampler expecting the message signal to have a given characteristic at a definable point in the window of expectation, preferably at the center of the window. In the case of edge-coded message signals, the expected signal characteristic is an edge change in the message signal.

In the advantageous embodiment of the invention claimed in claim 2, provision is made for the control unit to control the reference point of the sampling pattern. The reference point is the temporal reference point in the sampling pattern relative to the incoming message signal. The sampling pattern itself, i.e. the cycle of the sampling pattern, is left unchanged. All that takes place is a shift in time of the sampling pattern relative to the incoming message signal.

This adjustment of the reference point gives a de facto resynchronization of the bit timing, i.e. the expected points in time are re-estimated on the basis of the timing measured. The current bit is either shortened or lengthened.

In the advantageous embodiment of the invention claimed in claim 3, the control unit is used for controlling the sampling period of the sampling pattern. In this embodiment there is thus a sustained change in the pattern of expectation. The sampling frequency may be corrected by means of a phase-locked loop (PLL), for example. In this way a sustained correction is made for an enduring deviation that builds up between the timings of the transmitter and receiver.

This adjustment is preferably maintained until the end of the message transmission, and the sampling period can be adjusted again in the further course of message transmission.

The invention has particular advantages with edge-coded signals. In edge-coded signals, the information in the message signal is determined by the times at which the edges occur in the signal. The amplitude of the message signal in an edge-coded signal does not convey any information. The Xerxes code is particularly suitable.

In the advantageous embodiment of the invention claimed in claim 5, the adjustment of the sampling parameter is performed by taking the dynamics of the signal quality into account. The dynamics of the signal quality are determined by, amongst other things, whether the signal quality varies continuously or abruptly and/or whether it varies slowly or quickly. The sampling of the signal parameter is then carried out as a function of the dynamics of the varying signal quality. When there is a fast, continuous degradation of the quality of the sampled signal, there should be fast feedback control of at least one sampling parameter. Similarly, when the dynamics of the variation in signal quality are less pronounced, the dynamics of the control of the sampling parameter may be less pronounced too.

The sampler may preferably be implemented as an A/D converter or threshold discriminator. The threshold discriminator preferably operates by n-times oversampling and emits a sequence of ones and zeros. The implementation of the sampler as an A/D converter opens up a wider range of opportunities for quality analysis. Hence, with signal edges of shallow gradient, for example, it is possible by means of an A/D converter to estimate the edge position from the waveform of the signal. The A/D converter should have a bandpass filter connected upstream of it to avoid any aliasing.

In the advantageous embodiment of the invention claimed in claim 7, a decoding unit and a checking unit are provided. The decoder decodes the bit stream formed by the sampled signal and preferably monitors it at the same time for any injuries to the code. The checking unit makes a check at the stage where the bit stream has been reconstructed, for example by means of a cyclic redundancy check (CRC). The errors detected by the decoding unit and the checking unit may preferably likewise be used to control the sampler.

As claimed in claim 8, these error signals are used for adjusting the control algorithm of the sampler. If, for example, it is the sampling period that is the sampling parameter controlled, the error signals may be used to change the length of the period at a greater or lesser speed. It is also possible for the threshold, from which a sampling parameter is altered, to be controlled preferably as a function of the error signals. If the decoding unit and/or the checking unit indicate errors, the threshold from which control comes into play may be lowered to stop further errors from occurring.

With edge-coded signals, the sampler generates a window of expectation within which it expects an edge to occur in the message signal. The expected point in time may, for example, be situated in the center or even at the edge of a window of expectation. If the edge in the received message signal occurs at or close to the expected point in time, the quality of the sampled signal is high and there is no need for the sampler to be controlled. If the signal edges actually received deviate significantly from the expected point in time, the quality of the sampled signal declines and control is exerted on at least one sampling parameter to raise the quality of the signal.

In principle, this invention may be used in all areas of application in the field of communications and storage technology. In particular, applications where safety is critical in automobile engineering, industrial automation, medical technology, etc. will benefit from the adaptive sampling in respect of the cost that has to be paid for the envisaged safety level.

With regard to the method, the object of the invention is achieved by a method as claimed in claim 10.

These and other aspects of the invention are apparent from and will be elucidated with reference to the embodiments described hereinafter.

Figure 1:
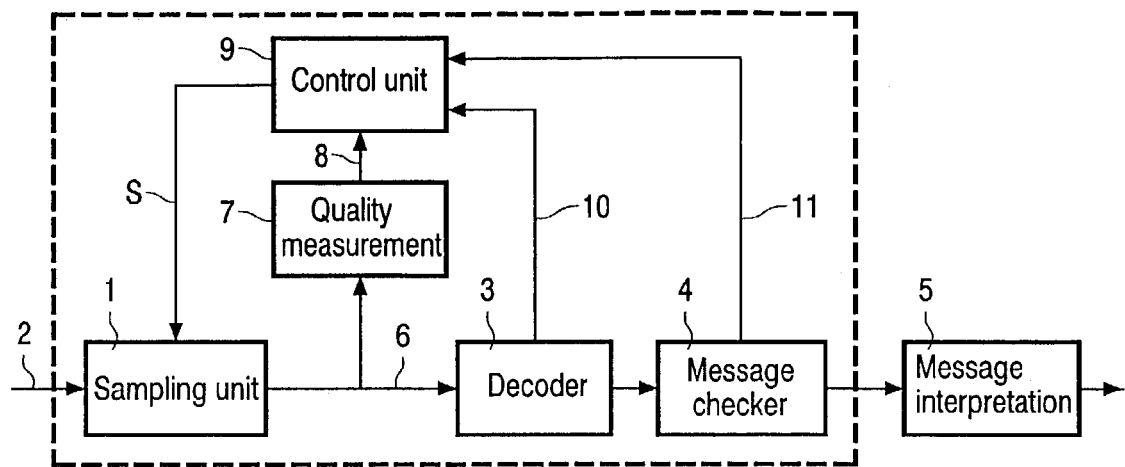
FIG. 1 is a block circuit diagram of a receiving circuit according to the invention.

FIG. 1 shows a receiving circuit having a sampling unit 1, to the input end of which a message signal 2 is fed. Connected downstream of the sampling unit 1 is a decoder 3 and connected downstream of the decoder 3 is a checking unit 4. Finally, there is a message interpretation unit 5 connected downstream of the checking unit 4. The output signal from the sampling unit 1, which is fed to the input end of the decoder 3, is referred to as a sampled signal 6. The sampled signal 6 is also fed to the input end of a signal-quality determining unit 7. The output signal that the signal-quality determining unit 7 supplies, as its output signal to a control unit 9, is a quality signal 8. Also fed to the control unit 9 are a first error signal 10 by the decoder 3 and a second error signal 11 by the checking unit 4. The control unit 9 supplies a control signal S to the sampling unit 1.

The message signal 2 fed to the sampling unit 1 is an analog signal that contains coded information. The message signal 2 is sampled by the sampling unit 1 and converted into the sampled signal 6. The sampling unit 1 may, for example, be implemented in the form of a threshold discriminator employing n-times oversampling. If this is the case, the sampling unit 1 supplies a sequence of zeros and ones to the decoder 3 as a sampled signal. Alternatively, the sampling unit 1 may be implemented in the form of an A/D converter. The latter is preferably of low resolution.

A higher degree of quality analysis can be carried out with an A/D converter of this kind. In this way it is possible, when the signal edges have a shallow gradient, for example, to use an A/D converter to estimate the positions of the edges in an edge-coded signal from the waveform of the signal even when the threshold discriminator should no longer operate correctly. If the sampling unit 1 is implemented as an A/D converter, the A/D converter should have a bandpass filter connected upstream of it, to avoid aliasing. The decoder 3 decodes the sampled signal and converts it into a bit stream. The message signal 2 may be a Xerxes-coded signal, for example. In such a case, the decoder 3 is implemented in the form of a Xerxes-decoder. In addition to the decoding, the decoder 3 also performs a monitoring operation for injuries of any kind to the code, and if a code injury is detected, it supplies a first error signal 10 to the control unit 9. The checking unit 4 connected upstream of the decoder 3 performs a check on the bit stream supplied by the decoder 3, for example by means of a cyclic redundancy check (CRC). If the checking unit 4 finds errors, it supplies a second error signal 11 to the control unit 9. The output signal from the checking unit 4 is fed to a message interpretation unit 5 that performs further message or data processing. The signal-quality determining unit 7 determines the quality of the sampled signal 6. The sampling unit 1 samples the message signal 2 at cyclic intervals and expects an event in the message signal 2 at given points in time or within given timespans. With edge-coded signals, for example, an event of this kind may be a change of edge. If the expected event, for example the change of edge, occurs at the point in time expected by the sampler or within the time span (window of expectation) expected by the sampler, the quality of the sampled signal is high and there is no need for the sampling unit 1 to be controlled. If, however, the event occurs in the sampled signal 6 at a point in time other than that expected, the quality of the sampled signal is low and it is advisable for the sampling unit 1 to be controlled. Deviations of this kind may, for example, occur as a result of inaccuracies in the bit synchronization between transmitter and receiver. The signal-quality determining unit 7 determines the quality of the sampled signal 6, i.e. checks to see whether the expected events are in fact present in the sampled signal 6 within the window of expectation or at the expected points in time. The signal-quality determining unit 7 passes on the deviations measured in this way to the control unit 9 in the form of a quality signal 8. The control unit 9 analyzes the quality signal 8 and decides whether it is necessary or advantageous for the sampling unit 1 to be controlled. If it is, it supplies a control signal 12 to the sampling unit 1 and thus controls at least one sampling parameter of the sampling unit 1. The sampling parameters controlled by the control unit 9 are preferably the reference point of the sampling pattern or the sampling period itself. This will be explained in detail below with reference to FIG. 2.

Figure 2:
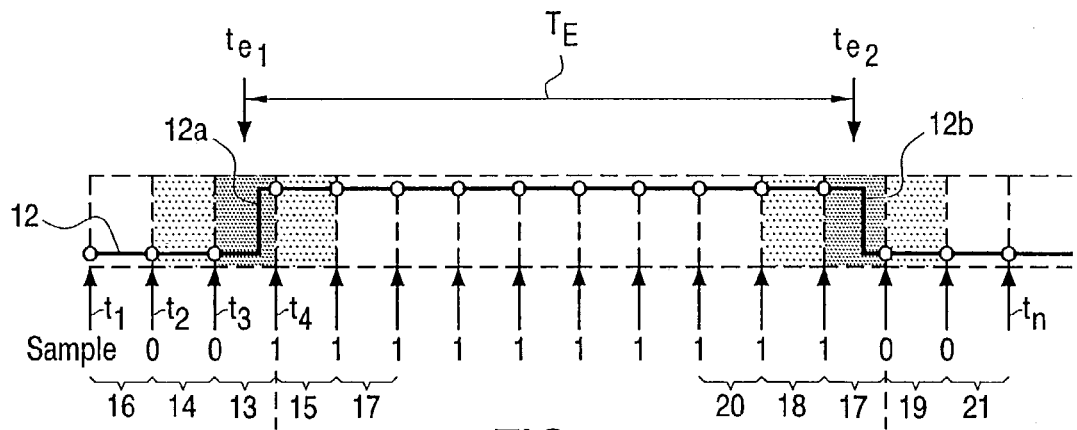
FIG. 2 shows the time-based waveform of an edge-coded message signal having signal edges at the edges of the bit time.

FIG. 2 shows an illustrative waveform over time of a message signal 12. The message signal 12 is edge-coded, i.e. the information is conveyed by the temporal sequence in which the edges occur. The message signal 12 has a first, rising edge 12a and a second, decaying edge 12b. The message signal 12 is sampled at points in time $t_1$, $t_2$ to $t_n$. This is indicated in FIG. 2 by vertical arrows. The results of the sampling are shown in FIG. 2 beneath the vertical arrows in the form of a bit sequence. The sampling as shown in FIG. 2 is performed by means of a threshold discriminator. The threshold discriminator emits a 0 as a sampled signal at points in time $t_1$, $t_2$ and $t_3$ and a 1 at point in time $t_4$. Hence, a change of edge occurred between points in time t3 and t4. As a result of the sampling at points in time $t_1$, $t_2$ to $t_n$, a sampling pattern is formed. FIG. 2 shows a window of expectation 13 within which the sampling unit 1 expects a change of edge. If the change of edge occurs within this window of expectation 13, then the quality of the sampled signal is high and there is no need for the control unit 9 to take any action on the sampling unit 1. Next to window of expectation 13 on its right and left are shown two tolerance windows 14 and 15. If the change of edge takes place within these tolerance windows 14 and 15, then although the quality of the sampled signal is no longer optimum, the deviation that exists is one that can still be tolerated, and there is as yet no adjustment or alteration made to the sampling parameters or method of sampling. To the right and left of tolerance windows 14 and 15 are error windows 16 and 17, respectively. If the change of edge takes place within these error windows 16 or 17, the quality of the sampled signal is so low that control of the sampling unit is required. The signal-quality determining unit 7 therefore supplies a quality signal 8 to the control unit 9 and this in turn supplies a control signal S to the sampling unit 1. As a result, the window of expectation 13 and hence the reference point in the sampling pattern is shifted and adjusted to the edge that actually occurred. This adjustment allows a de facto resynchronization of the bit timing to be performed, i.e. the window of expectation or the expected points in time are re-estimated on the basis of the timing measured. The current bit is either shortened or lengthened.

Rather than shortening or lengthening the bit period once or shifting the window of expectation, it is also possible for the sampling period itself to be shortened or lengthened. This results in a corresponding shortening or lengthening of the window of expectation 13, of the tolerance windows 14 and 15, and of the error windows 16 and 17. Feedback control of the sampling frequency, by means of a PLL, for example, results in a sustained correction of an enduring deviation that builds up between the bit timings of the transmitter and receiver. In addition, the error signals 10 and 11 from the decoder 3 and checking unit 4 may be used for controlling the sampling unit 1. In particular, the nature of the control can be influenced by these error signals 10 and 11. Hence, it is particularly advantageous for the dynamics of the control algorithm to be increased if the decoder 3 or the checking unit 4 emits an error signal. This may, for example, be done by exerting control in the event of the decoder 3 and/or the checking unit 4 emitting error signals even while the change of edge is within the tolerance window 14 or 15.

In a similar way, there are a window of expectation 17, two tolerance windows 18 and 19, and two error windows 20 and 21 set up for the second, decaying edge 12b. The temporal center of the window of expectation 13 sets a first expected point in time $t_{e1}$ and the temporal center of window of expectation 17 sets a second expected point in time $t_{e2}$. Expected points in time $t_{e1}$ and $t_{e2}$ each give the nominal point in time at which the signal edge is nominally expected.

The distance between expected points in time $t_{e1}$ and $t_{e2}$ forms the bit time $T_E$. This time is the length of one bit cycle.

Depending on the coding, provision may be made for other distances, such as odd multiples of half the bit time in the case of Xerxes coding, for example.

Figure 3:
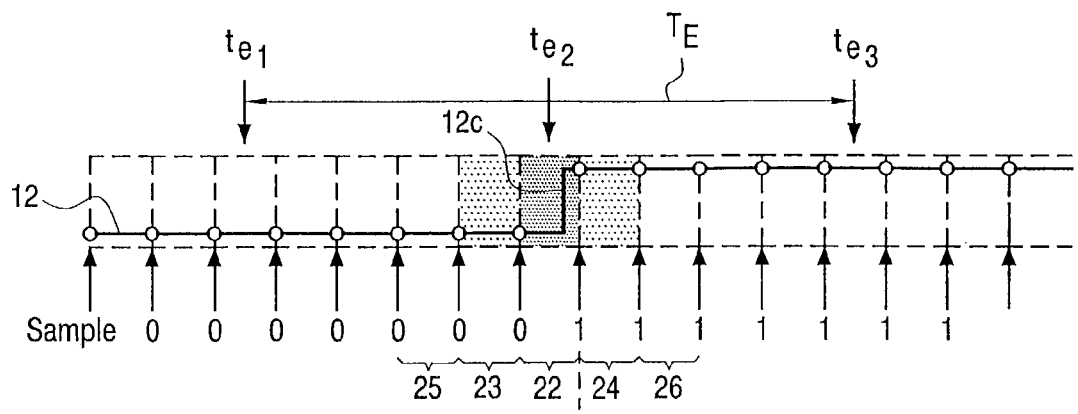
FIG. 3 shows the time-based waveform of an edge-coded message signal having a signal edge in the center of the bit time.

FIG. 3 shows an illustrative signal waveform of this kind for the message signal 12 in which there is an edge 12c that occurs in the center of a bit time $T_E$. In a similar way, provision is then made for an additional expected point in time in the center of the bit time, and in FIG. 3 this then gives, for example, three possible expected points in time $t_{e1}$, $t_{e2}$ and $t_{e3}$.

Set up in a similar way around the central expected point in time $t_e2$ are a window of expectation 22, two tolerance windows 23 and 24, and two error windows 25 and 26.

If FIGS. 2 and 3 are considered together, it can be seen that it is only possible for a sampled signal edge to be unambiguously assigned to a position, for example at the start of a bit time or in the center of the bit time, if the change of edge is situated within the time range defined by the window of expectation, the tolerance windows, and the error windows.

An additional check in the analysis of sampling quality could be the dynamics of the alteration that occurs. The condition that this approach sets is that the indicator for assessing the quality of the previous point of measurement has to be stored.

A basic requirement for obtaining the advantages of the dynamically adapted method of sampling is a slow, continuous deviation in one direction. This condition is met by a system behavior which, if there are deviations or drift on the part of the frequency generators or a temperature-related or age-related change in the transit delays in individual components (cables, network couplers), becomes apparent to the receiving nodes in the transmission channel as a degradation of the sampling quality.

An abrupt change in sampling quality may be attributable to, for example, signal streams modified by incoming EM radiation. As far as possible, such changes are not to result in any shift in the window of expectation (by $T_E/2$ in the worst case). A sort of low pass filter in the adjusting algorithm for the bit timing can minimize this effect.

An algorithm could for example be described as follows:

If an edge is assigned to an error window, i.e. an adjustment will normally be made to the sampling frequency or sample interpretation, then a check is first made to see whether the previous value had also moved away from the ideal point in time (window of expectation, expected point in time) and was already in the tolerance window. If there is a history of this kind, the adjustment is made. If not, the indication is ignored, it is concluded that the signal was corrupted in some spurious way and the pattern or window of expectation is not shifted. There are also other algorithms that are possible in this case, which look, for example, at a longer term history for the decision, or form a mean and hence correct only part of the deviation found.

The input signal may be subject to lowpass filtering (in the value range), which filters out signal peaks of the order of 1 . . . m sampling periods. Both analog filters and digital filters, for example, based on a weighted shift register structure, are conceivable for this purpose. A unit of this kind would be provided upstream of the signal-quality determining unit described above, i.e. the stated sequence of 0's and 1's would form the output of a filter of this kind and the input sequence for the mapping described to the reference marks and for the application of the quality windows.

The invention claimed is:

1. A receiving circuit, the receiving circuit receiving a message signal, the message signal expected to contain an event in relation to a reference point, the reference point being at least one of a given point in time or a given timespan, the receiving circuit comprising:

a sampler, the sampler sampling the message signal based on a sampling period and providing a sampled signal;

a signal-quality determining unit, the signal-quality determining unit receiving the sampled signal and, responsive to the sampled signal, providing a quality signal representative of the relationship between the event and the reference point;

a control unit, the control unit providing a control signal responsive to the quality signal, so as to control the sampler as to at least one sampling parameter;

at least one of a decoder and a checking unit, the decoder and checking unit receiving the sampled signal and, responsive thereto, providing respective error signals to the control unit; and wherein, responsive at least in part to at least one of such error signals, the control unit provides the control signal, wherein the decoder decodes the sampled signal using an edge-decoder consistent with the edge-coding of the message signal; and wherein the control unit analyzes the quality signal with reference to a window of expectation, a tolerance window and an error window, so as to determine whether the event occurs within one of these windows, the control unit, responsive to such analyzing, is informed in providing the control signal according to at least one of the following: (a) if the event occurs within the window of expectation, there is no need for the control unit to take any action as to control of the sampler; (b) if the event occurs within the tolerance window, the control unit can tolerate the deviation from the window of expectation or can take action to control the sampler; and (c) if the event occurs within the error window, control of the sampler is required.

2. A receiving circuit as claimed in claim 1, wherein the control unit controls at least one of the reference point and the sampling period.

3. A receiving circuit as claimed in claim 1, wherein the control unit, via the control signal and as so informed, responsively controls at least one of the reference point and the sampling period.

4. A receiving circuit as claimed in claim 1, wherein the control unit provides a control signal to adjust at least one of the reference point and the sampling period responsive to at least one of the respective error signals, the adjustment being different than it would have been in the absence of such respective error signals.

5. A receiving circuit as claimed in claim 1, wherein the control unit controls the sampler, at least in part, by analyzing a selected history of the quality signal.

6. A receiving circuit as claimed in claim 1, wherein the control unit analyzes the quality signal with reference to at least one given point in time.

7. A receiving circuit as claimed in claim 1, wherein the signal-quality determining unit provides a quality signal representative of measured deviations between the event and the reference point.

8. A receiving circuit as claimed in claim 1, wherein the signal-quality determining unit provides a quality signal representative of measured deviations between the event and the reference point, with reference to a window of expectation, a tolerance window and an error window.

9. A receiving circuit as claimed in claim 8, wherein the control unit, responsive to quality signal, is informed in providing the control signal according to at least one of the following: (a) if the event occurs within the window of expectation, there is no need for the control unit to take any action as to control of the sampler; (b) if the event occurs within the tolerance window, the control unit can tolerate the deviation from the window of expectation or can take action to control the sampler; and (c) if the event occurs within the error window, control of the sampler is required.

* * * * *